United States Patent
Kondo et al.

(10) Patent No.: US 9,810,852 B2
(45) Date of Patent: Nov. 7, 2017

(54) OPTICAL RECEPTACLE

(71) Applicant: TOTO LTD., Kitakyushu-shi, Fukuoka (JP)

(72) Inventors: Sho Kondo, Fukuoka-Ken (JP); Hirotsugu Agatsuma, Fukuoka-Ken (JP); Satoshi Hakozaki, Fukuoka-Ken (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 15/402,573

(22) Filed: Jan. 10, 2017

(65) Prior Publication Data

US 2017/0146747 A1 May 25, 2017

Related U.S. Application Data

(63) Continuation of application No. 14/900,451, filed as application No. PCT/JP2014/067264 on Jun. 27, 2014, now Pat. No. 9,575,262.

(30) Foreign Application Priority Data

Jun. 28, 2013 (JP) .................................. 2013-136499
Mar. 7, 2014 (JP) .................................. 2014-045651

(51) Int. Cl.
*G02B 6/38* (2006.01)
*G02B 6/42* (2006.01)

(52) U.S. Cl.
CPC ........... *G02B 6/3846* (2013.01); *G02B 6/382* (2013.01); *G02B 6/3834* (2013.01);
(Continued)

(58) Field of Classification Search
None
See application file for complete search history.

(56) References Cited

U.S. PATENT DOCUMENTS

| 4,988,161 A | 1/1991 | Fujikawa et al. |
| 5,018,821 A | 5/1991 | Kurata |

(Continued)

FOREIGN PATENT DOCUMENTS

| JP | 2001-066468 A | 3/2001 |
| JP | 2003-075679 A | 3/2003 |

(Continued)

*Primary Examiner* — Jerry Rahll
(74) *Attorney, Agent, or Firm* — Carrier Blackman & Associates, P.C.; William D. Blackman; Jingli Wang (57) ABSTRACT

According to an aspect of the invention, an optical receptacle, comprising: a fiber stub including an optical fiber, a ferrule, and an elastic member, the optical fiber including cladding and a core for conducting light, the ferrule having a through-hole fixing the optical fiber, the elastic member being filled into the through-hole of the ferrule with the optical fiber; and a holder holding the fiber stub, the through-hole of the ferrule including a small diameter portion and a large diameter portion, the optical fiber being disposed in the small diameter portion, the large diameter portion being provided on a side opposite to a side to be optically connected to a plug ferrule, the optical fiber being disposed in the small diameter portion inside the through-hole of the ferrule over the entire region of the optical fiber, the elastic member having substantially the same refractive index as the core, being filled into the small diameter portion and the large diameter portion, and being polished to cause at least a portion of the elastic member to be a flat surface portion at an end surface of the fiber stub on the side opposite to the side to be optically connected to the plug ferrule. By disposing the optical fiber in the small diameter portion of the through-hole of the ferrule over the entire region of the optical fiber, the breaking and/or cracking of the optical fiber and the decrease of the coupling efficiency can be prevented. Further, by setting the end surface of the elastic member filled into the through-hole of the ferrule to be a flat surface, the decrease of the coupling efficiency due to reflections is (Continued)

prevented without performing processing of the optical fiber end surface; and economic production is made possible.

12 Claims, 7 Drawing Sheets

(52) U.S. Cl.
CPC ......... *G02B 6/3843* (2013.01); *G02B 6/3855* (2013.01); *G02B 6/3863* (2013.01); *G02B 6/4292* (2013.01)

(56) References Cited

U.S. PATENT DOCUMENTS

| | | |
|---|---|---|
| 5,363,461 A | 11/1994 | Bergmann |
| 5,499,310 A | 3/1996 | Ueda |
| 2002/0039472 A1 | 4/2002 | Takeuti et al. |
| 2005/0207710 A1 | 9/2005 | Tanaka et al. |
| 2007/0137255 A1 | 6/2007 | Miyake et al. |
| 2007/0183723 A1 | 8/2007 | Matsumoto et al. |
| 2009/0274421 A1 | 11/2009 | Arayama et al. |
| 2010/0054666 A1 | 3/2010 | Michitsuji et al. |
| 2014/0321812 A1 | 10/2014 | Bauco et al. |
| 2015/0378107 A1 | 12/2015 | Akashi et al. |

FOREIGN PATENT DOCUMENTS

| | | |
|---|---|---|
| JP | 2004-133299 A | 4/2004 |
| JP | 2005-157147 A | 6/2005 |
| JP | 2006-030381 A | 2/2006 |
| JP | 2006-119633 A | 5/2006 |

OPTICAL RECEPTACLE

CROSS-REFERENCE TO RELATED APPLICATIONS

This application is a continuation application of U.S. patent application Ser. No. 14/900,451, filed on Dec. 21, 2015, which is the US National Phase of International Application PCT/JP2014/067264, filed 27 Jun. 2014, which is based upon and claims the benefit of priority from Japanese Patent Application Nos. 2013-136499, filed on Jun. 28, 2013, and 2014-045651, filed on Mar. 7, 2014. The entire contents of these prior applications are incorporated herein by reference.

BACKGROUND OF THE INVENTION

Field of the Invention

Embodiments of the invention relate generally to an optical receptacle relating to an optical transceiver module for optical communication.

Background Art

An optical receptacle is used as a component for optically connecting an optical fiber connector to an optical element such as a light receiving element, a light emitting element, etc., in an optical module of an optical communication transceiver (e.g., referring to Patent Document 1).

In recent years, it is necessary to increase the speed of optical communication transceivers as IP traffic increases. Generally, the configurations of the transceiver and the like that employ the receptacle-type optical module are standardized; and it is necessary to downsize the optical module because the space necessary for the electronic circuit increases as the modulation rate of the optical signal emitted from a semiconductor laser which is one optical element is increased.

As an optical receptacle for downsizing the optical module, a method such as that of Patent Document 2 is known in which a recess having a tubular configuration is provided in a portion of the ferrule and a lateral groove having a prescribed width is provided on the optical element side. In such a case, it is necessary to be in a state in which the optical fiber protrudes from the through-hole of the ferrule to easily perform processing of the optical fiber end portion; and there are problems of breaking when an external force is applied to the optical fiber, or of the coupling efficiency decreasing due to movement of the protruding portion of the optical fiber when using as an optical module.

Also, a method is known in which a large diameter portion is provided in the through-hole of the ferrule, and a resin that is transmissive is filled into the periphery of the fiber (e.g., referring to Patent Document 3). However, in such a case, when a temperature change occurs due to the different coefficients of thermal expansion of the optical fiber and the resin filled into the periphery of the optical fiber, there are problems of stress being applied to and breaking the optical fiber and the fiber tip undesirably moving. These problems occur particularly when the optical fiber is positioned toward the outer side from the center of the large diameter portion of the through-hole of the ferrule. Also, because processing of the end surface of the optical fiber is necessary, there is a problem of economic production being difficult.

CITATION LIST

Patent Literature

[Patent Citation 1] JP 2001-66468 A (Kokai)
[Patent Citation 2] JP 4119872
[Patent Citation 3] JP 2004-133299 A (Kokai)

SUMMARY OF INVENTION

Technical Problem

To solve the problems recited above, embodiments of the invention are directed to provide an optical receptacle that makes economic production possible and prevents breaking and cracking of the optical fiber occurring due to an external force and/or temperature changes when downsizing the optical receptacle.

Solution to Problem

According to an aspect of the invention, there is provided an optical receptacle, comprising: a fiber stub including an optical fiber, a ferrule, and an elastic member, the optical fiber including cladding and a core for conducting light, the ferrule having a through-hole fixing the optical fiber, the elastic member being filled into the through-hole of the ferrule with the optical fiber; and a holder holding the fiber stub, the through-hole of the ferrule including a small diameter portion and a large diameter portion, the optical fiber being disposed in the small diameter portion, the large diameter portion being provided on a side opposite to a side to be optically connected to a plug ferrule, the optical fiber being disposed in the small diameter portion inside the through-hole of the ferrule over the entire region of the optical fiber, the elastic member having substantially the same refractive index as the core, being filled into the small diameter portion and the large diameter portion, and being polished to cause at least a portion of the elastic member to be a flat surface portion at an end surface of the fiber stub on the side opposite to the side to be optically connected to the plug ferrule.

DESCRIPTION OF EMBODIMENTS

A first aspect of the invention is an optical receptacle, comprising: a fiber stub including an optical fiber, a ferrule, and an elastic member, the optical fiber including cladding and a core for conducting light, the ferrule having a through-hole fixing the optical fiber, the elastic member being filled into the through-hole of the ferrule with the optical fiber; and a holder holding the fiber stub, the through-hole of the ferrule including a small diameter portion and a large diameter portion, the optical fiber being disposed in the small diameter portion, the large diameter portion being provided on a side opposite to a side to be optically connected to a plug ferrule, the optical fiber being disposed in the small diameter portion inside the through-hole of the ferrule over the entire region of the optical fiber, the elastic member having substantially the same refractive index as the core, being filled into the small diameter portion and the large diameter portion, and being polished to cause at least a portion of the elastic member to be a flat surface portion at an end surface of the fiber stub on the side opposite to the side to be optically connected to the plug ferrule.

According to the optical receptacle, by disposing the optical fiber in the small diameter portion of the through-hole of the ferrule over the entire region of the optical fiber, a large external force can be prevented from being applied directly to the optical fiber; and the breaking and/or cracking of the optical fiber and the decrease of the coupling efficiency can be prevented. Further, by setting the end surface, which is on the side opposite to the end surface where the fiber stub is to be connected to the plug ferrule, to be a flat surface while setting the refractive index of the elastic member filled into the through-hole of the ferrule to be substantially equivalent to that of the core of the optical fiber, the decrease of the coupling efficiency due to reflections is prevented without performing processing of the optical fiber end surface; and economic production is made possible.

A second aspect of the invention is the optical receptacle according to the first aspect of the invention, wherein the flat surface portion of the elastic member protrudes further than an end surface of the ferrule at the end surface of the fiber stub on the side opposite to the side to be optically connected to the plug ferrule.

According to the optical receptacle, because the elastic member normally is soft compared to ceramics generally used as the material of the ferrule and quartz glass generally used as the material of the optical fiber, the flat surface can be formed easily; and it is possible to produce the optical receptacle economically.

A third aspect of the invention is an optical receptacle, comprising: a fiber stub including an optical fiber, a ferrule, a transparent member, and an elastic member, the optical fiber including a core conducting light, the ferrule having a through-hole fixing the optical fiber, the transparent member being fixed to the ferrule, the elastic member fixing the optical fiber to the ferrule and fixing the transparent member to the ferrule; and a holder holding the fiber stub, the through-hole including a small diameter portion and a large diameter portion, the large diameter portion having a diameter larger than a diameter of the small diameter portion and being provided on a side opposite to a side where the fiber stub is to be optically connected to a plug ferrule as viewed from the small diameter portion, the entire optical fiber being disposed in the small diameter portion, the elastic member being filled between the optical fiber and the transparent member.

According to the optical receptacle, because the entire optical fiber is disposed in the small diameter portion of the through-hole of the ferrule, a large external force can be prevented from being applied directly to the optical fiber; and the breaking and/or cracking of the optical fiber and the decrease of the coupling efficiency can be prevented. Also, because the elastic member is filled between the optical fiber and the transparent member, the decrease of the coupling efficiency due to reflections of the light at the interface between the optical fiber and the transparent member can be prevented. Also, because the polishing of the end surface of the optical fiber is unnecessary, economic production is made possible.

A fourth aspect of the invention is the optical receptacle according to the third aspect of the invention, wherein a refractive index of the elastic member is substantially the same as a refractive index of the core.

According to the optical receptacle, the reflections of the light at the interface between the elastic member and the core of the optical fiber can be suppressed; and the decrease of the coupling efficiency can be prevented.

A fifth aspect of the invention is the optical receptacle according to the third aspect of the invention, wherein a refractive index of the transparent member is substantially the same as a refractive index of the core.

According to the optical receptacle, the reflections of the light at the interfaces between the transparent member and the core of the optical fiber and between the transparent member and the elastic member can be suppressed; and the decrease of the coupling efficiency can be prevented.

A sixth aspect of the invention is the optical receptacle according to the third aspect of the invention, wherein at least a portion of a first end surface of the transparent member has a flat surface, the first end surface being provided on the side opposite to the side where the fiber stub is to be optically connected to the plug ferrule.

According to the optical receptacle, the reflections of the light at the first end surface of the transparent member can be suppressed; and the decrease of the coupling efficiency can be prevented.

A seventh aspect of the invention is the optical receptacle according to the sixth aspect of the invention, wherein the flat surface is tilted at a prescribed angle with respect to a plane perpendicular to a central axis of the ferrule.

According to the optical receptacle, by preventing the light reflected at the first end surface of the transparent member from returning to the light emitting element, the light emitting element can operate stably.

An eighth aspect of the invention is the optical receptacle according to the sixth aspect of the invention, wherein the first end surface protrudes further outside the large diameter portion than does a second end surface of the ferrule, the second end surface being provided on the side opposite to the side where the fiber stub is to be optically connected to the plug ferrule.

According to the optical receptacle, because the end surface protrudes further than the end surface of the ferrule when forming a portion of the end surface of the transparent member to be the flat surface, the flat surface can be formed more easily by polishing, etc.

A ninth aspect of the invention is the optical receptacle according to the third aspect of the invention, wherein a central axis of the large diameter portion is tilted at a constant angle with respect to a central axis of the ferrule.

According to the optical receptacle, by disposing the transparent member in the large diameter portion of the ferrule, it is possible to determine with high precision the direction in which the light is reflected by the end surface of the transparent member. The light that is reflected at the end surface of the transparent member can be prevented from returning to the light emitting element; and the light emitting element can operate stably.

A tenth aspect of the invention is the optical receptacle according to the third aspect of the invention, wherein the large diameter portion has a slit having a constant width and passing through a central axis of the ferrule.

According to the optical receptacle, the large diameter portion of the through-hole of the ferrule can be formed easily. Also, in the case where the bottom surface of the large diameter portion is formed to have a constant angle with respect to the central axis of the ferrule, the optical module can be assembled with high precision because the tilt direction of the bottom surface of the large diameter portion can be visually confirmed easily.

Embodiments of the invention will now be illustrated with reference to the drawings. Similar components in the drawings are marked with the same reference numerals, and a detailed description is omitted as appropriate.

Figure 1:
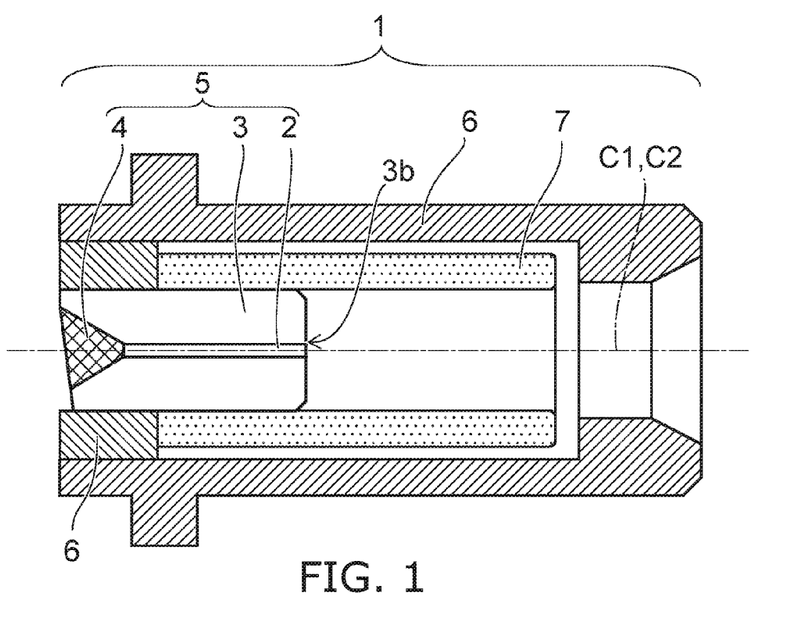
FIG. 1 is a schematic cross-sectional view of an optical receptacle showing a first embodiment of the invention.

FIG. 1 is a schematic cross-sectional view of an optical receptacle showing a first embodiment of the invention.

The optical receptacle 1 is made of a fiber stub 5, a holder 6 holding the fiber stub 5, and a sleeve 7, where the fiber stub 5 is made of an optical fiber 2 for conducting light, a ferrule 3 having a through-hole 3b in which the optical fiber 2 is fixed, and an elastic member 4 filled into the through-hole 3b of the ferrule 3 with the optical fiber 2, one end of the sleeve 7 is capable of holding a tip of the fiber stub 5, one other end of the sleeve 7 is capable of holding a plug ferrule inserted into the optical receptacle 1, and the optical fiber 2 includes a core and cladding and is fixedly adhered using the elastic member 4 inside the through-hole 3b of the ferrule 3. The plug ferrule that is inserted into the optical receptacle 1 is not shown.

Figure 2:
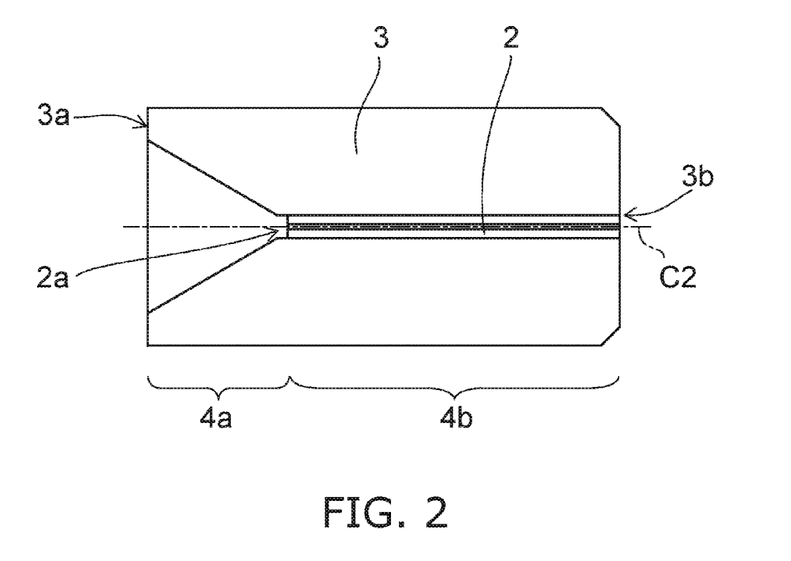
FIG. 2 is a schematic cross-sectional view of the fiber stub showing the first embodiment of the invention.

FIG. 2 is a schematic cross-sectional view of the fiber stub showing the first embodiment of the invention.

The through-hole 3b of the ferrule 3 includes a small diameter portion 4b for fixing the optical fiber 2 on the side to be optically connected to the plug ferrule, and a large diameter portion 4a for filling the elastic member 4 on the side opposite to the side to be optically connected to the plug ferrule. The optical fiber 2 is disposed inside the small diameter portion 4b of the ferrule 3 over the entire region of the optical fiber 2. The elastic member 4 is filled into the large diameter portion 4a of the ferrule 3 and the gap between the optical fiber 2 and the through-hole 3b of the ferrule 3; and the elastic member 4 is closely adhered to an end surface 2a of the optical fiber 2 on the side opposite to the side to be optically connected to the plug ferrule. Here, the elastic member 4 is not shown for better understanding of the indicators.

Although materials suited to the ferrule 3 include a ceramic, glass, etc., a zirconia ceramic is used in the embodiment; the optical fiber 2 is fixedly adhered in the through-hole 3b at the center of the ferrule 3; and one end to be optically connected to the plug ferrule is formed by polishing into a convex spherical surface. Also, the fiber stub 5 is pressed into the holder 6 and fixed by the holder 6 in the assembly of the optical receptacle 1.

Although materials suited to the sleeve 7 include a resin, a metal, a ceramic, etc., a split sleeve made of a zirconia ceramic having a slit in the total length direction was used in the embodiment. At the one end, the sleeve 7 can hold the tip portion of the fiber stub 5 polished into the convex spherical surface; and at the one other end, the sleeve 7 can hold the plug ferrule inserted into the optical receptacle 1.

Even in the case where the large diameter portion 4a has a cylindrical configuration, the through-hole 3b of the ferrule 3 may have a configuration that has a diameter increasing gradually toward an end surface 3a of the fiber stub 5 (the ferrule 3) on the side opposite to the side to be optically connected to the plug ferrule. In FIG. 1 and FIG. 2, the configuration has a diameter increasing gradually toward the end surface 3a.

It is desirable for the diameter of the maximum diameter portion of the increasing-diameter portion to be $\phi 0.6$ mm or more to avoid interference with the ferrule 3 of the light emitted from the light emitting element and incident on the optical fiber 2 or the light emitted from the optical fiber 2 and incident on the light receiving element regardless of the configuration of the increasing-diameter portion.

The optical fiber 2 is fixedly adhered in the small diameter portion 4b of the through-hole 3b of the ferrule 3 over the entire region of the optical fiber 2. Here, the small diameter portion 4b is the portion having an inner diameter such that the inner diameter of the through-hole 3b of the ferrule 3 is not more than twice the outer diameter of the optical fiber 2.

The end surface 2a of the optical fiber 2 on the side opposite to the side to be optically connected to the plug ferrule can be a flat surface substantially perpendicular to a central axis C1 of the optical receptacle 1. Here, substantially perpendicular refers to an angle of 85 to 95 degrees with respect to the central axis C1 of the optical receptacle 1. Thereby, the coupling efficiency can be increased further.

The elastic member 4 is filled without a gap between the optical fiber 2 and the through-hole 3b of the ferrule 3. Thereby, the bias of the elastic member 4 filled into the periphery of the optical fiber 2 is small; and the occurrence of breaking and/or cracks of the optical fiber 2 due to the coefficient of thermal expansion difference between the elastic member 4 and the optical fiber 2 when the optical receptacle 1 is exposed to a temperature change can be prevented. Further, because the fluctuation amount in the diametral direction of the optical fiber end surface 2a inside the through-hole 3b of the ferrule 3 is small, the time for aligning the optical fiber end surface 2a with the light emitting element or the light receiving element is reduced. Here, different elastic members 4 may be used at the small diameter portion 4b and the large diameter portion 4a.

The elastic member 4 that is transmissive is filled into the through-hole 3b of the ferrule 3. The elastic member 4 has a refractive index near that of the core of the optical fiber 2. Here, it is desirable for the refractive index near that of the core to be about 1.4 to 1.6. Also, the elastic member 4 can be the same as the substance that fixes the optical fiber 2 in the through-hole 3b of the ferrule 3.

Also, the elastic member 4 has an elastic modulus that is low compared to that of the ceramic used as the material of the ferrule 3 and the quartz glass used as the material of the optical fiber 2. Examples include, for example, an epoxy resin, an acrylic resin, a silicon resin, etc.

Here, the elastic member 4 is closely adhered without a gap at the end surface 2a of the optical fiber 2 on the side opposite to the side to be optically connected to the plug ferrule. Thereby, the reflections of the light incident on the optical fiber 2 or emitted from the optical fiber 2 at the interface between the elastic member 4 and the end surface 2a of the optical fiber 2 can be reduced; and the coupling efficiency of the optical module can be increased.

Also, although in a conventional optical receptacle, generally, the end surface 2a of the optical fiber 2 is flattened by processing to reduce the reflections described above, according to the embodiment of the invention, efficient and economic production is possible because it is unnecessary to flatten the end surface 2a of the optical fiber 2 by polishing.

The end surface of the elastic member 4 on the end surface 3a side of the ferrule 3 is polished to be a flat surface substantially perpendicular to a central axis C2 of the ferrule 3 or having a constant angle with respect to the central axis C2 of the ferrule 3. Thereby, the reflections of the light incident on the optical fiber 2 or emitted from the optical fiber 2 at the interface between the elastic member 4 and the air can be reduced; and there is an effect that the coupling efficiency increases. Here, it is desirable for substantially perpendicular to refer to about 85 degrees to 95 degrees with respect to the central axis C2 of the ferrule 3. Also, the constant angle refers to, for example, 4 degrees to 10 degrees as viewed from an angle of 90 degrees with respect to the central axis C2 of the ferrule 3.

Also, although in a conventional optical receptacle, generally, the end surface 2a of the optical fiber 2 is formed to be a flat surface by disposing the end surfaces of the optical fiber 2 and the ferrule 3 in substantially the same plane and by simultaneously polishing both the optical fiber 2 and the ferrule 3 to reduce the reflections described above, the elastic member 4 normally is softer than the optical fiber 2 and the ferrule 3; and therefore, it is possible to form the flat surface more easily than conventionally; and efficient and economic production is possible.

As a method for forming the end surface of the elastic member 4 to be the flat surface, there is a method using a polishing film including a diamond abrasive, etc. Also, it is desirable for the surface roughness of the flat surface to be not more than an arithmetic average roughness of 0.1 micrometers to reduce the reflection amount of the light as much as possible.

Figure 3:
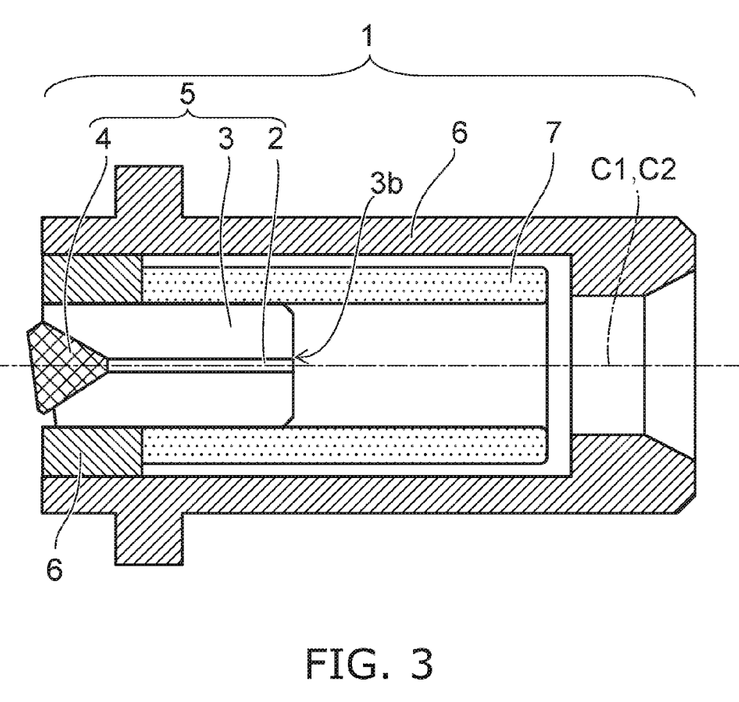
FIG. 3 is a schematic cross-sectional view of an optical receptacle showing a second embodiment of the invention.

FIG. 3 is a schematic cross-sectional view of an optical receptacle showing a second embodiment of the invention.

The member that is included in the optical receptacle 1 is similar to that of the first embodiment; and the end surface of the elastic member 4 protrudes further than the end surface of the ferrule 3 on the side opposite to the end surface of the fiber stub 5 to be optically connected to the plug ferrule.

In a conventional optical receptacle, generally, as described above, the end surfaces of the optical fiber 2 and the ferrule 3 are disposed in the same plane and polished simultaneously to form the flat surface efficiently in the end surface 2a of the optical fiber 2. According to the embodiment of the invention, when forming the flat surface of the elastic member 4 on the side opposite to the end surface where the fiber stub 5 is to be optically connected to the plug ferrule, it is sufficient to polish only the elastic member 4; normally, the elastic member 4 can be polished easily because the elastic member 4 is softer than the optical fiber 2 and the ferrule 3; and the flat surface can be formed efficiently and economically.

Figure 4A:
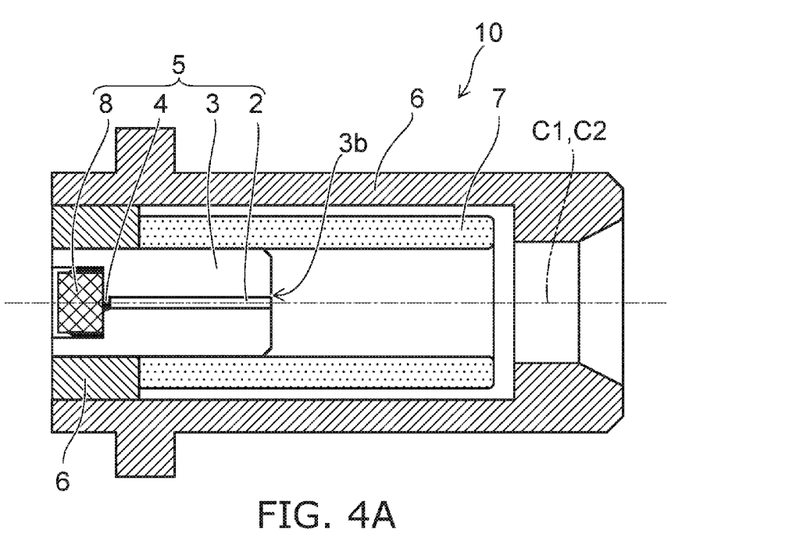
FIG. 4A and FIG. 4B are schematic cross-sectional views of an optical receptacle showing a third embodiment of the invention.
Figure 4B:
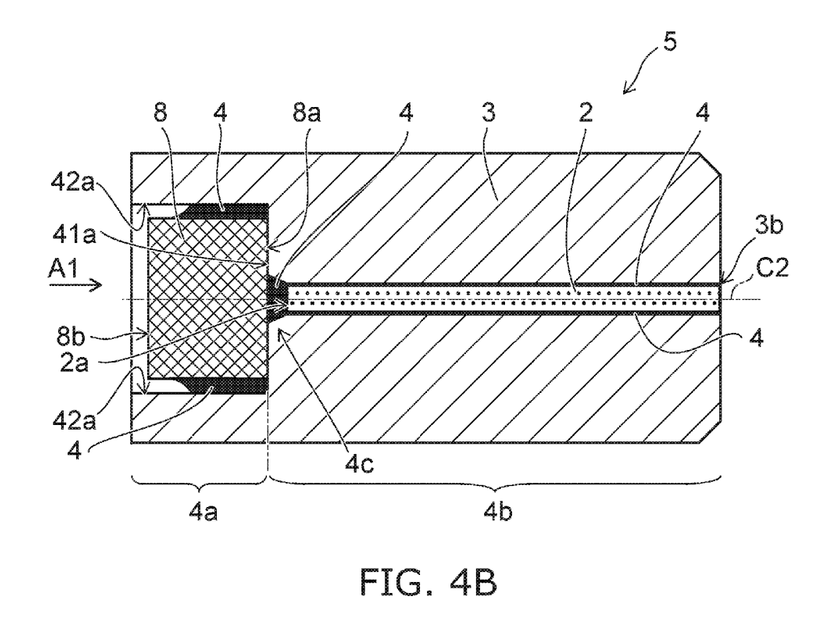

FIG. 4 is a schematic cross-sectional view of an optical receptacle showing a third embodiment of the invention.

Figure 5:
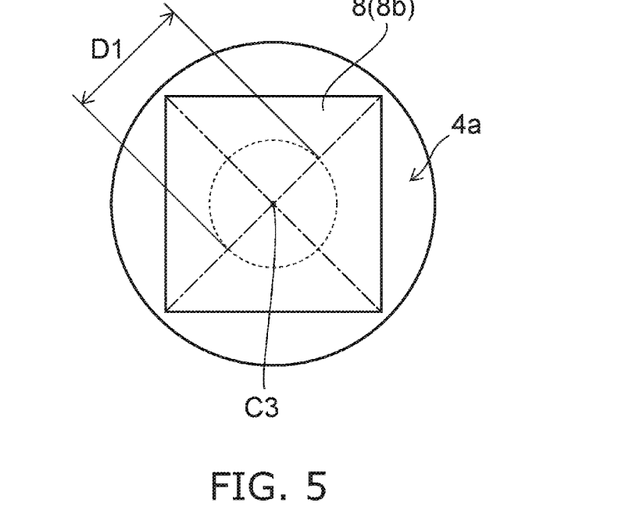
FIG. 5 is a schematic plan view showing the large diameter portion as viewed in the direction of arrow A1 shown in FIG. 4B.

FIG. 5 is a schematic plan view showing the large diameter portion as viewed in the direction of arrow A1 shown in FIG. 4B.

FIG. 4A is a schematic cross-sectional view showing the optical receptacle according to the embodiment. FIG. 4B is a schematic cross-sectional view showing the fiber stub of the embodiment.

The optical receptacle 10 shown in FIG. 4A includes the fiber stub 5, the holder 6, and the sleeve 7. The fiber stub 5 includes the optical fiber 2, a transparent member 8, the ferrule 3, and the elastic member 4. The optical fiber 2 includes a core and cladding and conducts light. The transparent member 8 transmits light. The ferrule 3 has the through-hole 3b for fixing the optical fiber 2 and the transparent member 8. The elastic member 4 is filled between the optical fiber 2 and the transparent member 8. The holder 6 holds the fiber stub 5. At one end, the sleeve 7 is capable of holding the tip of the fiber stub 5; and at one other end, the sleeve 7 is capable of holding the plug ferrule inserted into the optical receptacle 10. The optical fiber 2 and the transparent member 8 are fixedly adhered using the elastic member 4 inside the through-hole 3b of the ferrule 3. The plug ferrule that is inserted into the optical receptacle 10 is not shown.

As shown in FIG. 4B, the through-hole 3b of the ferrule 3 includes the small diameter portion 4b and the large diameter portion 4a, where the small diameter portion 4b is for fixing the optical fiber 2 on the side to be optically connected to the plug ferrule, and the large diameter portion 4a is for disposing at least a portion of the transparent member 8 on the side opposite to the side to be optically connected to the plug ferrule. The elastic member 4 is filled into the gap between the optical fiber 2 and the small diameter portion 4b of the through-hole 3b of the ferrule 3. The elastic member 4 is filled into the gap between the transparent member 8 and the optical fiber 2. The elastic member 4 is filled into at least a portion of the region between the transparent member 8 and the large diameter portion 4a of the through-hole 3b of the ferrule 3. The end surface 2a of the optical fiber 2 on the side opposite to the side to be optically connected to the plug ferrule is closely adhered to the elastic member 4. An end surface 8a of the transparent member 8 on the optical fiber 2 side is closely adhered to the elastic member 4.

Even in the case where the large diameter portion 4a of the through-hole 3b of the ferrule 3 has a cylindrical configuration, the configuration may have a diameter increasing gradually toward the end surface of the fiber stub 5 on the side opposite to the side to be optically connected to the plug ferrule. In the embodiment as shown in FIG. 5, the large diameter portion 4a has a cylindrical configuration. The diameter of the large diameter portion 4a is larger than the diameter of the small diameter portion 4b.

To cause the light incident on the optical fiber 2 or emitted from the optical fiber 2 to be transmitted reliably through the transparent member 8, it is desirable for the diameter of an end surface (a first end surface) 8b of the transparent member 8 on the side opposite to the optical fiber 2 to be ϕ0.3 millimeters (mm) or more. For example, as shown in FIG. 5, in the case where the end surface 8b of the transparent member 8 has a quadrilateral configuration, it is desirable for an effective diameter (a diameter) D1 of the circle having a center C3 of the end surface 8b as the center to be not less than about 0.2 mm and not more than 0.5 mm. The center C3 of the end surface 8b is the intersection of the diagonal lines of the quadrilateral.

The optical fiber 2 is fixedly adhered to the small diameter portion 4b of the through-hole 3b of the ferrule 3 over the entire region of the optical fiber 2. That is, the entire optical fiber 2 is disposed in the small diameter portion 4b of the through-hole 3b of the ferrule 3. More specifically, the end surface 2a of the optical fiber 2 exists not in the large diameter portion 4a but in the interior of the small diameter portion 4b. Thereby, the strength of the optical fiber 2 can be ensured. As shown in FIG. 4B, a tapered portion 4c that has a diameter increasing from the small diameter portion 4b toward the large diameter portion 4a is provided at the connection portion between the small diameter portion 4b and the large diameter portion 4a. The tapered portion 4c is a portion of the small diameter portion 4b. Therefore, the end surface 2a of the optical fiber 2 may exist in the interior of the tapered portion 4c.

As shown in FIG. 4A to FIG. 5, the transparent member 8 has a substantially rectangular parallelepiped (including substantially cubic) configuration. A bottom surface 41a of the large diameter portion 4a is substantially perpendicular to the central axis C1 of the optical receptacle 10. A side surface 42a of the large diameter portion 4a is substantially parallel to the central axis C1 of the optical receptacle 10.

At least a portion of the end surface 8b of the transparent member 8 on the side opposite to the optical fiber 2 has a flat surface substantially perpendicular to the central axis C1 of the optical receptacle 10. Here, substantially perpendicular refers to an angle that is not less than about 85 degrees and not more than about 95 degrees with respect to the central axis C1 of the optical receptacle 10.

As a method for forming the flat surface in the end surface 8b of the transparent member 8, there is a method using a polishing film including a diamond abrasive, etc. Also, it is desirable for the surface roughness of the end surface 8b of the transparent member 8 to be not more than an arithmetic average roughness of 0.1 micrometers to reduce the reflection amount of the light as much as possible.

The elastic member 4 is filled without a gap between the optical fiber 2 and the small diameter portion 4b of the through-hole 3b of the ferrule 3. Thereby, the bias of the elastic member 4 filled into the periphery of the optical fiber 2 is small; and the occurrence of breaking and/or cracks of the optical fiber 2 due to the difference between the coefficient of thermal expansion of the elastic member 4 and the coefficient of thermal expansion of the optical fiber 2 when the optical receptacle 10 is exposed to a temperature change can be prevented. Further, because the fluctuation amount in the diametral direction inside the through-hole 3b of the ferrule 3 of the end surface 2a of the optical fiber 2 on the side opposite to the side to be optically connected to the plug ferrule is small, the time for aligning the end surface of the optical fiber 2 to the light emitting element or the light receiving element is reduced. Here, the material of the elastic member 4 in the small diameter portion 4b may be different from the material of the elastic member 4 in the large diameter portion 4a.

The elastic member 4 is filled without a gap between the optical fiber 2 and the end surface 8a of the transparent member 8. Here, it is desirable for the elastic member 4 and the transparent member 8 to have refractive indexes that are substantially the same as the refractive index of the core of the optical fiber 2. Here, substantially the same refractive index is not less than about 1.4 and not more than about 1.6. The refractive index of the core of the optical fiber 2 is, for example, not less than about 1.46 and not more than about 1.47. The refractive index of the elastic member 4 is, for example, not less than about 1.4 and not more than about 1.5. The refractive index of the transparent member 8 is, for example, not less than about 1.4 and not more than about 1.6. Thereby, the reflections of the light at the interface between the transparent member 8 and the elastic member 4 and at the interface between the elastic member 4 and the optical fiber 2 can be reduced; and the coupling efficiency of the optical module increases.

The elastic member 4 has an elastic modulus that is low compared to those of the ceramic used as the material of the ferrule and the quartz glass used as the material of the optical fiber. For example, examples include an epoxy resin, an acrylic resin, a silicon resin, etc.

Although in a conventional optical receptacle, generally, polishing is performed to form the end surface 2a of the optical fiber 2 into a mirror surface-like flat surface to reduce the reflections described above, according to the embodiment of the invention, the reflections of the light at the end surface 2a can be reduced without similarly performing polishing of the end surface 2a of the optical fiber 2. Also, the fixing strength of the transparent member 8 can be ensured. Further, downsizing of the optical receptacle 10 can be realized.

The material and the like of the members and the other structures of the optical receptacle 10 are as described above in reference to FIG. 1 and FIG. 2.

Figure 6:
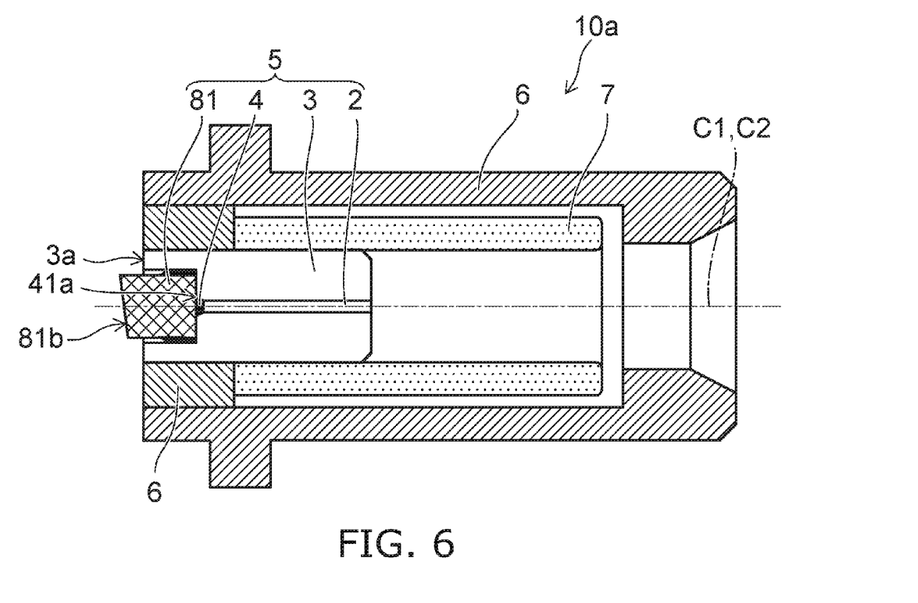
FIG. 6 is a schematic cross-sectional view of an optical receptacle showing a fourth embodiment of the invention.

FIG. 6 is a schematic cross-sectional view of an optical receptacle showing a fourth embodiment of the invention.

The members included in the optical receptacle 10a shown in FIG. 6 are similar to those of the third embodiment. The bottom surface 41a of the large diameter portion 4a is substantially perpendicular to the central axis C1 of the optical receptacle 10. At least a portion of an end surface (a first end surface) 81b of a transparent member 81 on the side opposite to the optical fiber 2 is polished into a flat surface having a constant angle with respect to the central axis C2 of the ferrule 3. Thereby, the reflections of the light at the interface between the transparent member 81 and the air can be reduced; and there is an effect that the coupling efficiency increases. Also, the light that is emitted from the light emitting element and reflected at the end surface 81b of the transparent member 81 can be prevented from returning to the light emitting element; and the light emitting element can operate stably. Also, the reflections of the light can be reduced without processing the end surface 2a of the optical fiber 2 obliquely. Here, the constant angle is, for example, not less than about 4 degrees and not more than about 12 degrees as viewed from an angle of 90 degrees with respect to the central axis C2 of the ferrule 3. The other structures of the optical receptacle 10a are similar to those of the third embodiment.

The end surface 81b of the transparent member 81 on the side opposite to the optical fiber 2 protrudes further than the end surface (the second end surface) 3a of the fiber stub 5 (the ferrule 3) on the side opposite to the side to be optically connected to the plug ferrule. More specifically, the end surface 81b of the transparent member 81 protrudes further outside the large diameter portion 4a than does the end surface 3a of the ferrule 3. Thereby, only the transparent member 81 can be polished when performing the polishing of an end surface 81a of the transparent member 81; and the optical receptacle 10a can be produced efficiently.

Figure 7:
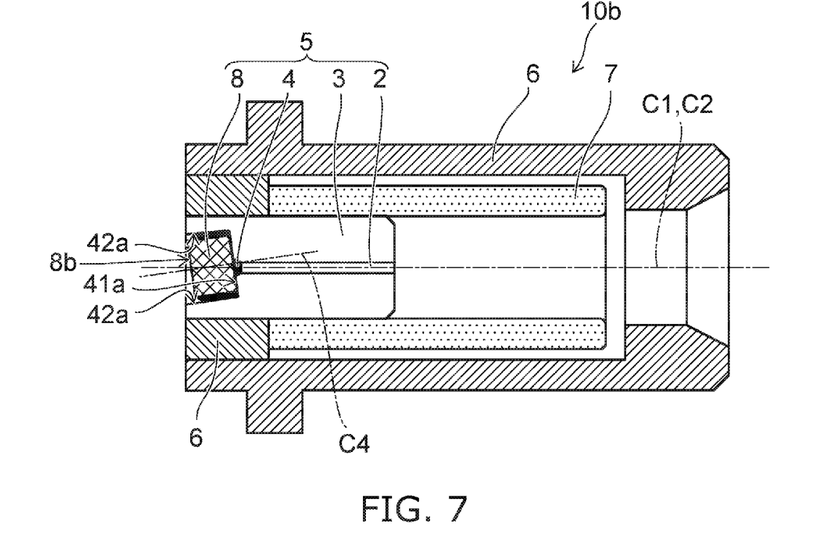
FIG. 7 is a schematic cross-sectional view of an optical receptacle showing a fifth embodiment of the invention.

FIG. 7 is a schematic cross-sectional view of an optical receptacle showing a fifth embodiment of the invention.

The members included in the optical receptacle 10b shown in FIG. 7 are similar to those of the third embodiment. The large diameter portion 4a of the through-hole 3b made in the ferrule 3 is made to have a constant angle with respect to the central axis C2 of the ferrule 3. That is, a central axis C4 of the large diameter portion 4a is tilted at a constant angle with respect to the central axis C2 of the ferrule 3. More specifically, the bottom surface 41a of the large diameter portion 4a and the side surface 42a of the large diameter portion 4a are formed to have constant angles with respect to the central axis C2 of the ferrule 3. The transparent member 8 has a substantially rectangular parallelepiped (including substantially cubic) configuration.

Thereby, the end surface 8b of the transparent member 8, in which at least a portion of the end surface 8b on the side opposite to the optical fiber 2 is pre-processed to be a flat surface, can be disposed to have a prescribed angle with respect to the central axis C2 of the ferrule 3 by merely disposing the transparent member 8 to follow the large diameter portion 4a of the through-hole 3b when disposing the transparent member 8 inside the large diameter portion 4a of the through-hole 3b of the ferrule 3; and the optical receptacle 10b can be produced efficiently. Also, the reflections of the light can be reduced without obliquely processing the end surface 2a of the optical fiber 2 and the end surface 8b of the transparent member 8. Here, the prescribed angle is, for example, not less than about 4 degrees and not more than about 12 degrees as viewed from an angle of 90 degrees with respect to the central axis C2 of the ferrule 3.

Figure 8:
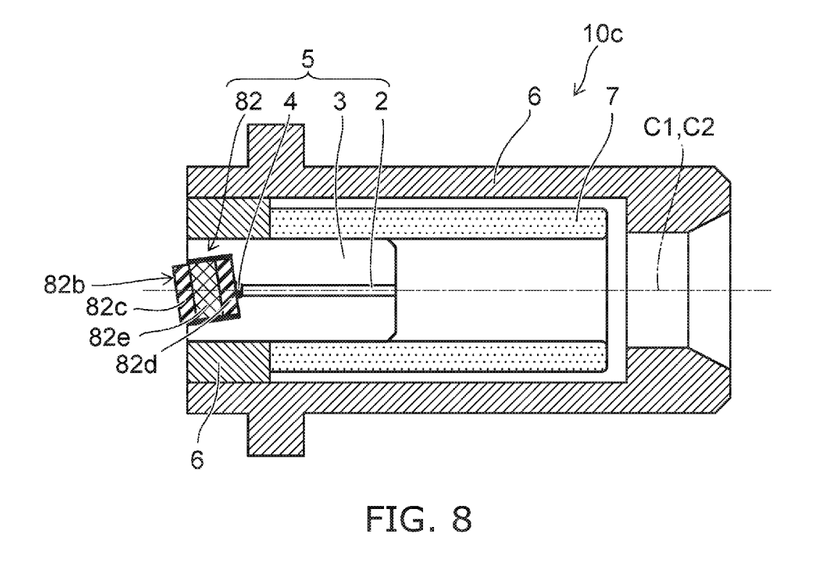
FIG. 8 is a schematic cross-sectional view of an optical receptacle showing a sixth embodiment of the invention.

FIG. 8 is a schematic cross-sectional view of an optical receptacle showing a sixth embodiment of the invention.

The optical receptacle 10c shown in FIG. 8 has a structure in which the transparent member 8 of the optical receptacle 10b described above in reference to FIG. 7 is replaced with an isolator 82. The other structures of the optical receptacle 10c are similar to those of the fifth embodiment.

The isolator 82 includes a first polarizer 82c, a second polarizer 82d, and a Faraday rotator 82e. The Faraday rotator 82e is provided between the first polarizer 82c and the second polarizer 82d. The Faraday rotator 82e includes, for example, a material such as garnet, etc. Thereby, the light that is emitted from the light emitting element and incident on the optical fiber 2 or the light that is emitted from the optical fiber 2 and incident on the light receiving element can be transmitted in only one direction.

An AR (anti-reflective) coating is performed on an end surface 82b of the isolator 82 on the side opposite to the optical fiber 2. The end surface 82b of the isolator 82 is disposed to have a prescribed angle with respect to the central axis C2 of the ferrule 3. Thereby, the reflections of the light at the end surface 82b of the isolator 82 are suppressed or the reflected light is prevented from returning to the light emitting element; and the light emitting element can operate stably.

Figure 9A:
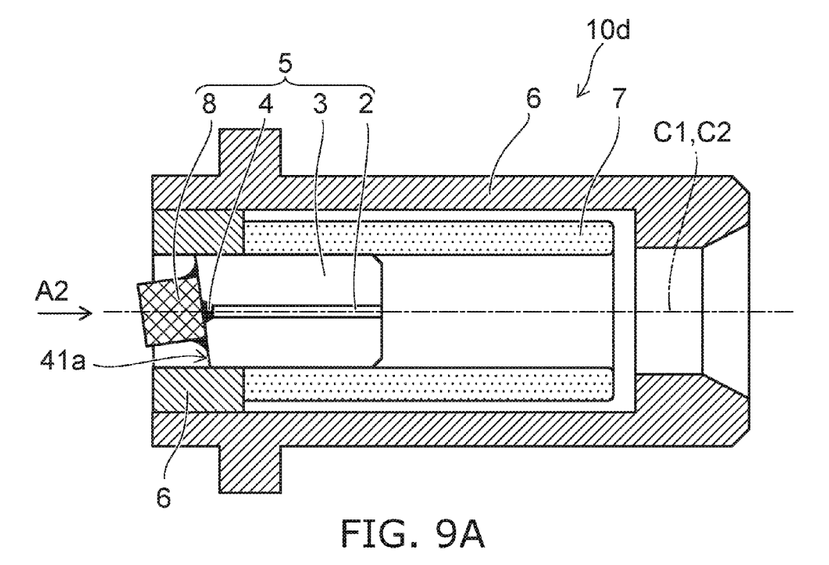
FIG. 9A and FIG. 9B are schematic views of an optical receptacle showing a seventh embodiment of the invention.
Figure 9B:
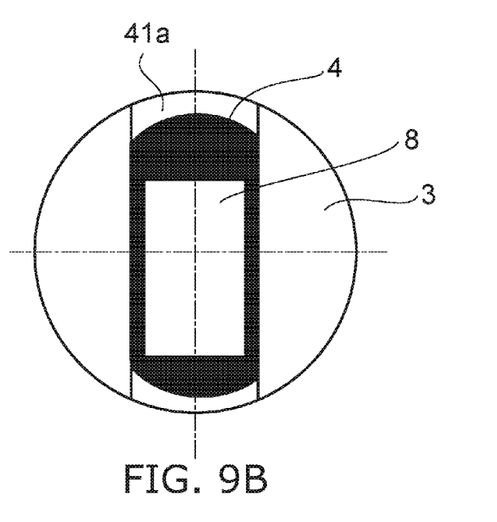

FIG. 9 is a schematic view of an optical receptacle showing a seventh embodiment of the invention.

Figure 10A:
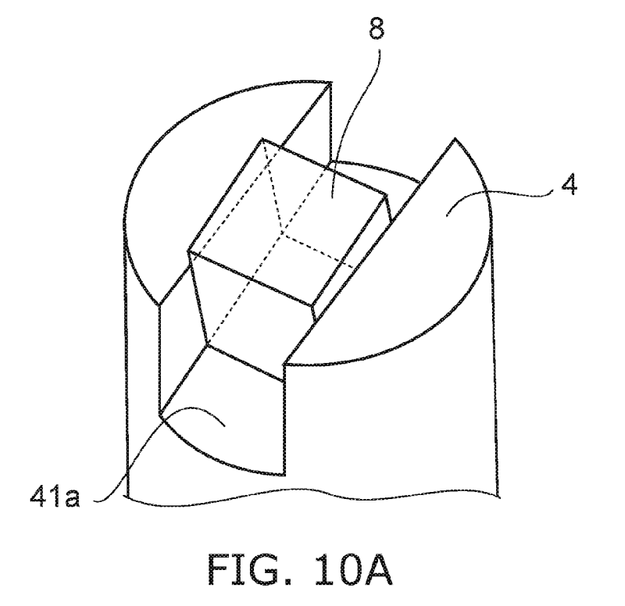
FIG. 10A and FIG. 10B are schematic perspective views showing the fiber stub of the embodiment.
Figure 10B:
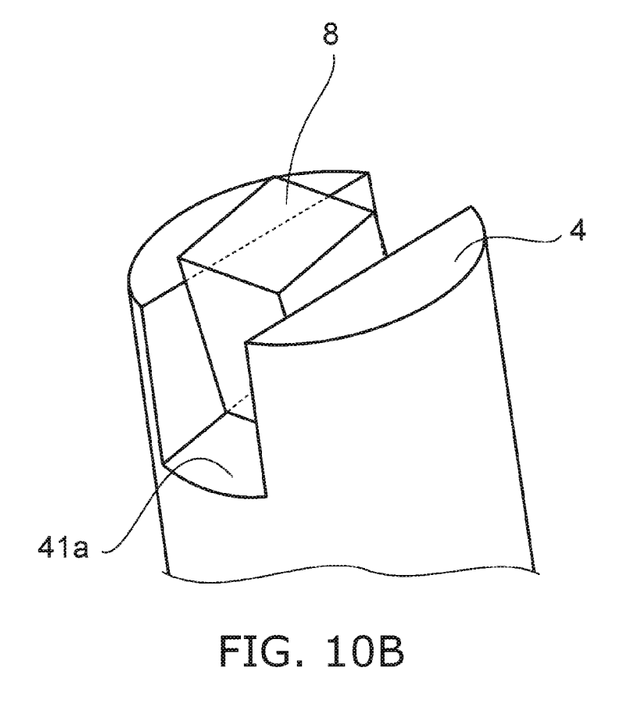

FIG. 10 is a schematic perspective view showing the fiber stub of the embodiment.

FIG. 9A is a schematic cross-sectional view showing the optical receptacle according to the embodiment. FIG. 9B is a schematic plan view showing the large diameter portion as viewed in the direction of arrow A2 shown in FIG. 9A.

The members included in the optical receptacle 10d shown in FIG. 9A are similar to those of the third embodiment. The large diameter portion 4a of the through-hole 3b made in the ferrule 3 has a slit that has a constant width and passes through the central axis C2 of the ferrule 3. The bottom surface 41a of the large diameter portion 4a (in the embodiment, the slit) is formed to have a constant angle with respect to the central axis C2 of the ferrule 3. Here, the constant angle is, for example, not less than about 4 degrees and not more than about 12 degrees as viewed from an angle of 90 degrees with respect to the central axis C2 of the ferrule 3. The transparent member 8 has a substantially rectangular parallelepiped (including substantially cubic) configuration.

Thereby, the optical receptacle 10d can be assembled with high precision with the light emitting element or the light receiving element because not only can the large diameter portion 4a of the through-hole 3b of the ferrule 3 be made easily, but also the tilt direction of the bottom surface 41a of the large diameter portion 4a can be visually confirmed easily when forming the bottom surface 41a of the large diameter portion 4a to have the constant angle with respect to the central axis C2 of the ferrule 3.

The embodiments of the invention have been described above. However, the invention is not limited to the above description. Those skilled in the art can appropriately modify the above embodiments, and such modifications are also encompassed within the scope of the invention as long as they include the features of the invention. For instance, the shape, dimension, material, arrangement and the like of various components in the fiber stub 5 and the like, and the installation configuration and the like of the ferrule 3 and the optical fiber 2 are not limited to those illustrated, but can be modified appropriately.

Furthermore, various components in the above embodiments can be combined with each other as long as technically feasible. Such combinations are also encompassed within the scope of the invention as long as they include the features of the invention.

INDUSTRIAL APPLICABILITY

According to the embodiments of the invention, an optical receptacle is provided in which, by disposing the optical fiber in the small diameter portion of the through-hole of the ferrule over the entire region of the optical fiber, the breaking of the optical fiber and the decrease of the coupling efficiency can be prevented; further, by setting the end surface of the elastic member filled into the through-hole of the ferrule to be a flat surface even without performing processing of the fiber end surface, the decrease of the coupling efficiency due to reflections is prevented; and economic production is possible.

REFERENCE NUMERAL LIST

1 optical receptacle
2 optical fiber
2a end surface
3 ferrule
3a end surface
3b through-hole
4 elastic member
4a large diameter portion
4b small diameter portion
4c tapered portion
5 fiber stub
6 holder
7 sleeve
8 transparent member
8a, 8b end surface
10, 10a, 10b, 10c, 10d optical receptacle
41a, 42a side surface
81 transparent member
81a, 81b end surface
82 isolator
82b end surface
82c first polarizer
82d second polarizer
82e Faraday rotator

The invention claimed is:

1. An optical receptacle, comprising:
a fiber stub including an optical fiber, a ferrule, an isolator, and an elastic member, the optical fiber including a core conducting light, the ferrule having a through-hole fixing the optical fiber, the isolator being fixed to the ferrule, the elastic member fixing the optical fiber to the ferrule and fixing the isolator to the ferrule; and
a holder holding the fiber stub,
the through-hole including a small diameter portion and a large diameter portion, the large diameter portion having a diameter larger than a diameter of the small diameter portion and being provided on a side opposite to a side where the fiber stub is to be optically connected to a plug ferrule as viewed from the small diameter portion, the entire optical fiber being disposed in the small diameter portion, the elastic member being filled between the optical fiber and the isolator.

2. The optical receptacle according to claim 1, wherein a refractive index of the elastic member is substantially the same as a refractive index of the core.

3. The optical receptacle according to claim 1, wherein a refractive index of the isolator is substantially the same as a refractive index of the core.

4. The optical receptacle according to claim 1, wherein at least a portion of a first end surface of the isolator has a flat surface, the first end surface being provided on the side opposite to the side where the fiber stub is to be optically connected to the plug ferrule.

5. The optical receptacle according to claim 4, wherein the flat surface is tilted at a prescribed angle with respect to a plane perpendicular to a central axis of the ferrule.

6. The optical receptacle according to claim 4, wherein the first end surface protrudes further outside the large diameter portion than does a second end surface of the ferrule, the second end surface being provided on the side opposite to the side where the fiber stub is to be optically connected to the plug ferrule.

7. The optical receptacle according to claim 1, wherein a central axis of the large diameter portion is tilted at a constant angle with respect to a central axis of the ferrule.

8. The optical receptacle according to claim 1, wherein the large diameter portion has a slit having a constant width and passing through a central axis of the ferrule.

9. The optical receptacle according to claim 1, wherein at least a portion of the isolator is disposed in the large diameter portion.

10. The optical receptacle according to claim 1, wherein an end surface of the isolator on a side of the optical fiber is fixed to a bottom surface of the large diameter portion, the end surface of the isolator being provided on a side where the fiber stub is to be optically connected to the plug ferrule.

11. The optical receptacle according to claim 1, wherein the elastic member is further filled into at least a portion of region between the isolator and the large diameter portion.

12. The optical receptacle according to claim 4, wherein the first end surface has a quadrilateral configuration.

* * * * *